US012641257B2

(12) United States Patent
Newman et al.

(10) Patent No.: US 12,641,257 B2
(45) Date of Patent: May 26, 2026

(54) METHODS AND APPARATUS FOR ENCODING TIMELAPSE VIDEO

(71) Applicant: GoPro, Inc., San Mateo, CA (US)

(72) Inventors: David Newman, San Diego, CA (US); Vadim Polonichko, Poway, CA (US)

(73) Assignee: GoPro, Inc., San Mateo, CA (US)

( * ) Notice: Subject to any disclaimer, the term of this patent is extended or adjusted under 35 U.S.C. 154(b) by 48 days.

(21) Appl. No.: 18/751,172

(22) Filed: Jun. 21, 2024

(65) Prior Publication Data

US 2025/0392736 A1     Dec. 25, 2025

(51) Int. Cl.
| | |
|---|---|
| *H04N 19/177* | (2014.01) |
| *H04N 19/46* | (2014.01) |
| *H04N 23/62* | (2023.01) |
| *H04N 23/65* | (2023.01) |
| *H04N 23/661* | (2023.01) |

(52) U.S. Cl.
CPC ........... *H04N 19/177* (2014.11); *H04N 19/46* (2014.11); *H04N 23/62* (2023.01); *H04N 23/651* (2023.01); *H04N 23/661* (2023.01)

(58) Field of Classification Search
CPC .... H04N 19/177; H04N 19/46; H04N 23/661; H04N 23/651; H04N 23/62
USPC ......................................... 375/240
See application file for complete search history.

(56) References Cited

U.S. PATENT DOCUMENTS 11,232,685 B1 *   1/2022  Nixon .................. G06V 10/757

* cited by examiner

*Primary Examiner* — Dominic D Saltarelli
(74) *Attorney, Agent, or Firm* — Wang Hardoon, P.C.

(57)     ABSTRACT

Systems, apparatus, and methods for encoding timelapse videos. Timelapse photography involves capturing a sequence of images at set intervals over a period of time and then playing them back at a higher speed. Unfortunately, timelapse photography introduces a variety of problems that conventional photography does not have. Exemplary embodiments capture light information in a power efficient manner and encode them in bulk (a video segment at a time). In some variants, the light information may be stored as raw data; in other variants, the light information may be stored as compressed images. The segment-based encoding has the additional benefit of creating identifiable breakpoints that allow for file access without interfering with the capture; this may be used to check the status of the video mid-recording.

18 Claims, 8 Drawing Sheets

Figure 1:
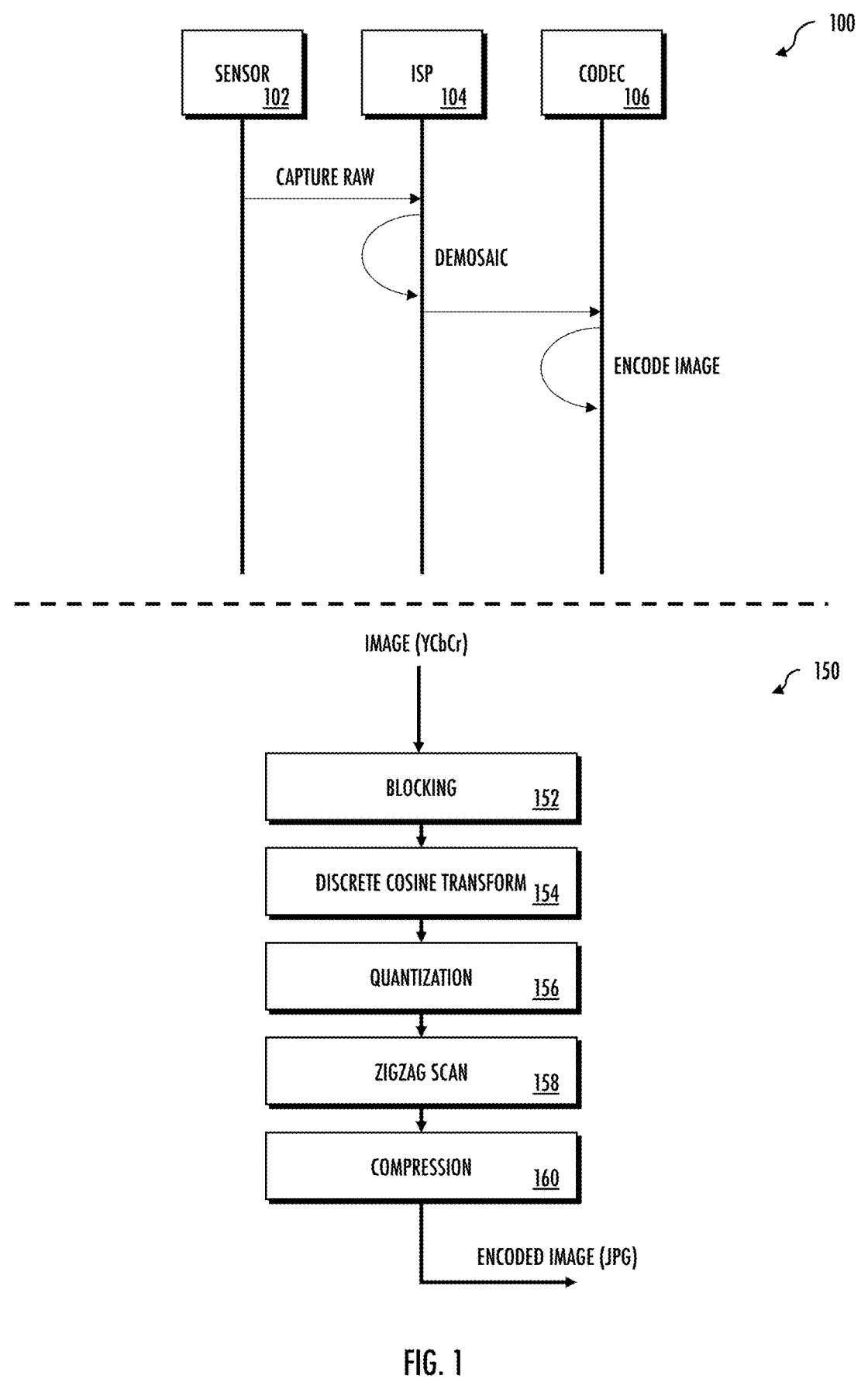

100

| SENSOR 102 | ISP 104 | CODEC 106 |

CAPTURE RAW

DEMOSAIC

ENCODE IMAGE

IMAGE (YCbCr)

150

| BLOCKING | 152 |

| DISCRETE COSINE TRANSFORM | 154 |

| QUANTIZATION | 156 |

| ZIGZAG SCAN | 158 |

| COMPRESSION | 160 |

ENCODED IMAGE (JPG)

METHODS AND APPARATUS FOR ENCODING TIMELAPSE VIDEO

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to encoding video content. Specifically, the present disclosure relates to encoding video at a different timescale from the capture timescale (e.g., such as timelapse).

DESCRIPTION OF RELATED TECHNOLOGY

The JPEG (Joint Photographic Experts Group) encoding standard is used to compress photographic images. The MPEG (Moving Picture Experts Group) is a related standards body; they promulgate an encoding standard for audio, video, and related data. These standards enable the efficient storage, capture, render, and transmission of multimedia content.

Timelapse refers to media that is played at a timescale (render rate) that is faster than its capture timescale (capture rate). For example, timelapse videos can be used to speed-up minutes or even hours of activity within just a few seconds. Slowmotion refers to media that is played at a timescale that is slower than its capture timescale. Both timelapse and slowmotion effects have important applications in action photography and cinematography.

BRIEF DESCRIPTION OF THE DRAWINGS

FIG. 1 is a ladder diagram of selected component interactions within a camera, and a logical flow of the steps involved in image encoding, useful in explaining various aspects of the present disclosure.

FIG. 5 is a ladder diagram of selected component interactions within a camera, and a logical flow of the steps involved in a second exemplary video encoding scheme, in accordance with various aspects of the present disclosure.

DETAILED DESCRIPTION

Figure 2:
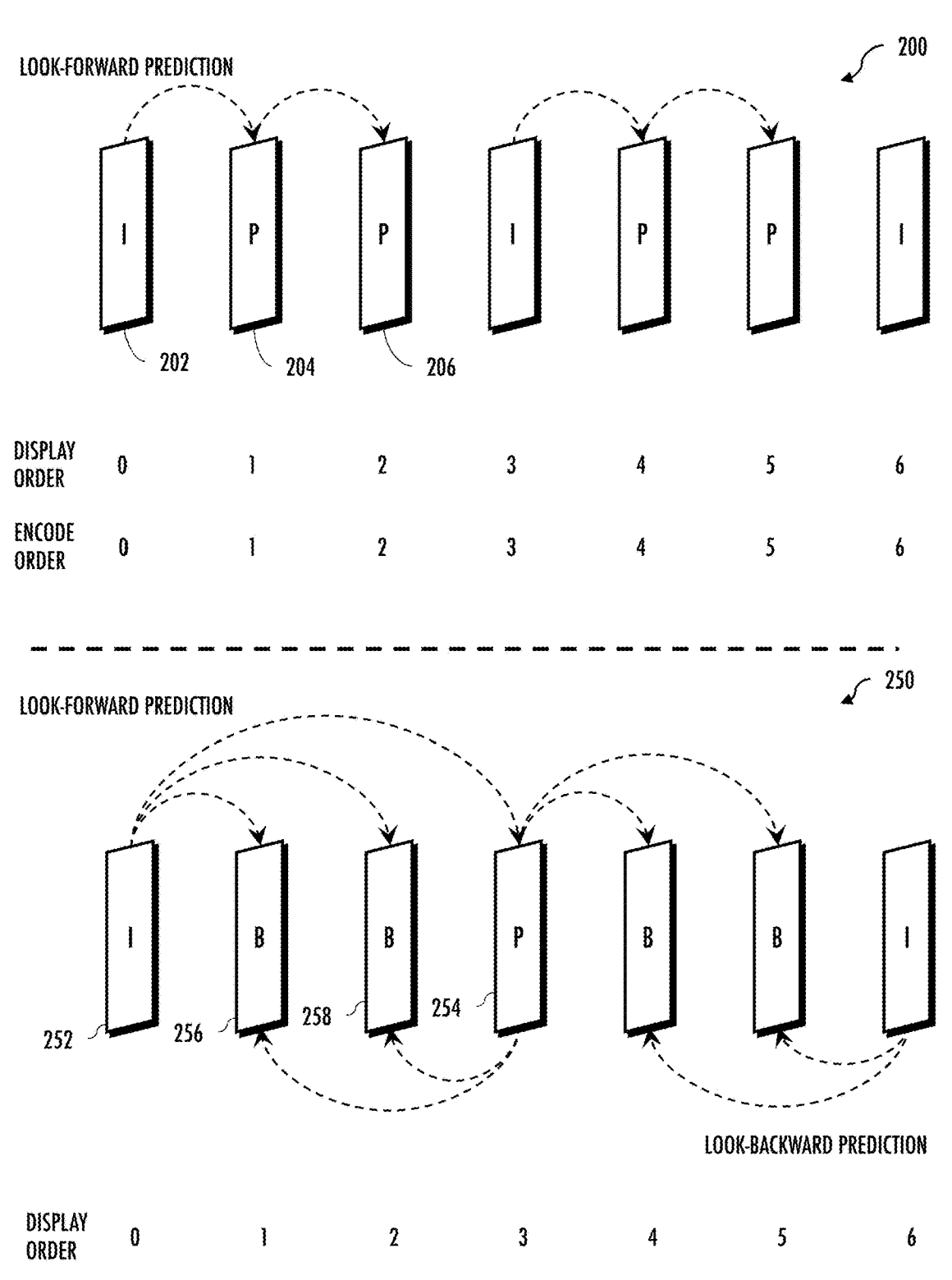
FIG. 2 is a graphical representation of different group of pictures (GOP) data structures, useful in explaining various aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Image and Video Encoding

FIG. 1 provides a ladder diagram 100 of selected component interactions within a camera, and a logical flow 150 of the steps involved in image encoding, useful in explaining various aspects of the present disclosure.

As shown, a camera sensor 102 captures raw light information (commonly referred to as "raw" data). Typically, the camera sensor 102 is a photoelectric sensor array that is coupled with a color filter array. Each sensor converts the amount of photons that passed through the color filter array into an electrical charge. The resulting charge represents a measured intensity of a specific wavelength, at a specific location. Raw image data is sensor-specific and generally must be converted into generic image formats before it can be rendered to a user.

The camera sensor has different mechanisms than the human eye. For example, the human eye's color receptivity changes according to light intensity whereas a camera does not, thus raw data must be "corrected" for these differences. Here, the image signal processor 104 converts raw light information into image data. Specifically, the raw data is analyzed to determine a representative color and intensity for each point of a two-dimensional array. In this case, the image format is YCbCr (Luma (Y), Blue Chrominance (Cb), Red Chrominance (Cr)), other image formats use similar techniques.

Images are large data structures that are difficult to store, manipulate, and/or transfer. However, in most cases, a significant amount of data is redundant and can be removed with little (if any) perceptual side effect. "Lossy" compression permanently removes data, "lossless" compression preserves the original digital data fidelity. Here, the codec 106 compresses the image data into a set of coded symbols. For example, a standard digital photograph of 12 megapixels at medium quality might be reduced from around 36 MB (raw data) to 3-6 MB in JPEG format, achieving a compression ratio of roughly 6:1 to 12:1. A variety of different factors affect coding efficiency e.g., quality parameters (lossiness), image content, resolution, etc. For relative comparison, the same image (36 MB of raw data) could be more aggressively compressed for network delivery (e.g., 10:1, 20:1), etc.

Image encoding may occur in a software or hardware codec. Software codecs are more flexible, whereas hardware codecs are often faster and more efficient. The following discussion is described in the context of the JPEG (Joint Photographic Experts Group) encoding standard, but other encoding standards may be substituted with equal success.

JPEG uses YCbCr image data since human vision is more sensitive to changes in brightness than color. This allows for greater compression of the chrominance components without significantly affecting perceived quality. If necessary, non-YCbCr (e.g., RGB, YUV, etc.) may be converted to YCbCr image data.

As a related optimization, in very aggressive compression schemes, chrominance components may also be further downsampled. A signal with chroma 4:4:4 has no compression. The first number, refers to the size of the sample. The two following numbers both refer to chroma. They are relative to the first number and define the horizontal and vertical sampling respectively. For example, 4:2:2 has half the chroma of 4:4:4, and 4:2:0 has a quarter of the color information available. The 4:2:2 signal will have half the sampling rate horizontally, but will maintain full sampling vertically. 4:2:0 will only sample colors out of half the pixels on the first row and ignores the second row of the sample completely.

At step 152, the image data is split into smaller blocks. Block sizes are typically selected based on the processing pipeline capabilities. However, since decoding is the inverse of encoding, some encoders may encode at smaller block sizes even when more capable hardware is available. For example, 8×8 blocks are commonly found in legacy hardware codecs, more advanced hardware codecs may support block sizes of 16×16, 64×64, etc.

At step 154, the image data is converted into frequency domain data. Each block undergoes a Discrete Cosine Transform (DCT), which converts the set of pixel values into a corresponding set of frequency coefficients. The frequency coefficients can be more effectively compressed since most of the perceptually important image information is concentrated in lower frequencies.

At step 156, frequency coefficients are quantized to reduce precision. Bit precision refers to the number of bits used to represent numbers; rounding to lower precision formats can improve compression (some rounding error is tolerable). For example, the DCT coefficients may be divided by a quantization matrix and then rounded to the nearest integer.

At step 158, the quantized frequency coefficients are re-ordered to group low-frequency coefficients together. Colloquially, this is referred to as a "zigzag" ordering, since the re-ordered grouping takes a zigzagging path (e.g., (0, 0), (1,0), (0, 1), (2, 0), (1,1), (0, 2), etc.) through most coefficient data structures. Clustering low-frequency components together synergistically improves entropy coding (step 160).

At step 160, the re-ordered frequency coefficients are entropy coded to provide further compression. Entropy coding reduces the size of the data by exploiting the patterns and redundancies in the data. JPEG encoders typically use run-length encoding (RLE) efficiently encode sequences of zero coefficients and Huffman encoding to assign shorter codewords to more frequent values and longer codewords to less frequent values.

The resulting data is packaged into a JPEG file format. The JPEG file format encodes some metadata (e.g., quantization tables, Huffman tables, and image dimensions, etc.) which may be used by the decoder to reverse the encoding process.

Video media is created by displaying a sequence of still images (frames) in succession to create the illusion of motion. Still image compression techniques, like JPEG described above, can leverage spatial similarities between blocks. Video compression techniques can leverage both spatial similarities within the same frame, as well as across different frames (temporal similarities). The MPEG (Moving Picture Experts Group) uses a group of pictures (GOP) data structure to organize sequences of consecutive video frames within a compressed video stream. Different GOP structures have different properties.

FIG. 2 is a graphical representation of different group of pictures (GOP) data structures, useful in explaining various aspects of the present disclosure. Referring first to video compression scheme 200, frames 0-6 of video may be represented with intra-frames (I-frames) and predicted frames (P-frames).

I-frames may be compressed with only intra-frame similarity. Every macroblock in an I-frame only refers to other macroblocks within the same frame. In other words, an I-frame can only use "spatial redundancies" in the frame for compression. Spatial redundancy refers to similarities between the pixels of a single frame.

P-frames may be compressed using temporal prediction in addition to spatial prediction. For motion estimation, P-frames use frames that have been previously encoded e.g., P-frame 204 is a "look-forward" from I-frame 202, and P-frame 206 is a "look-forward" from P-frame 204. Every macroblock in a P-frame can be temporally predicted, spatially predicted, or "skipped" (i.e., the co-located block has a zero-magnitude motion vector). Images often retain much of their pixel information between different frames, so P-frames are generally much smaller than I-frames but can be reconstructed into a full frame of video.

Preserving all the difference information between I-frames to P-frames results in lossless compression, usually however, some amount of difference information can be discarded to improve compression efficiency with very little perceptible impact. Unfortunately, lossy differences (e.g., quantization error) that have accumulated across many consecutive P-frames and/or other data corruptions (e.g., packet loss, etc.) might impact subsequent frames. As a practical matter, I-frames do not reference any other frames and may be inserted to "refresh" the video quality or recover from catastrophic failures. In other words, codecs are typically tuned to favor I-frames in terms of size and quality because they play a critical role in maintaining video quality. Ideally, the frequency of I-frames and P-frames is selected to balance accumulated errors and compression efficiency. For example, in video compression scheme 200, each I-frame is followed by two P-frames. Slower moving video has smaller motion vectors between frames and may use larger numbers of P-frames to improve compression efficiency. Conversely, faster moving video may need more I-frames to minimize accumulated errors.

More complex video compression techniques can use look-forward and look-backward functionality to further improve compression performance. Referring now to video compression scheme 250, frames 0-6 of video may be represented with intra-frames (I-frames), predicted frames (P-frames), and bi-directional frames (B-frames). Much like P-frames, B-frames use temporal similarity for compression-however, B-frames can use backward prediction (a look-backward) to compress similarities for frames that occur in the future, and forward prediction (a look-ahead) to compress similarities from frames that occurred in the past. In this case, B-frames 256, 258 each use look-forward information from I-frame 252 and look-backward information from P-frame 254. B-frames can be incredibly efficient for compression (more so than even P-frames).

In addition to compressing redundant information, B-frames also enable interpolation across frames. While P-frames may accumulate quantization errors relative to their associated I-frame, B-frames are anchored between I-frames, P-frames, and in some rare cases, other B-frames (collectively referred to as "anchor frames"). Typically, the quantization error for each B-frame will be less than the quantization error between its anchor frames. For example, in video compression scheme 250, P-frame 254 may have some amount of quantization error from the initial I-frame 252; the B-frames 256, 258 can use interpolation such that their quantization errors are less than the P-frame's error.

As used throughout, a "group of pictures" (GOP) refers to a multiple frame structure composed of a starting I-frame and its subsequent P-frames and B-frames. A GOP may be characterized by its distance between anchor frames (M) and its total frame count (N). In FIG. 2, video compression scheme 200 may be described as M=1, N=3; video compression scheme 250 may be described as M=3, N=7.

Bi-directional coding uses many more resources compared to unidirectional coding. Resource utilization can be demonstrated by comparing display order and encode/decode order. As shown in FIG. 2, video compression scheme 200 is unidirectional because only "look-forward" prediction is used to generate P-frames. In this scenario, every frame will either refer to itself (I-frame) or to a previous frame (P-frame). Thus, the frames can enter and exit the encoder/decoder in the same order. In contrast, video compression scheme 250 is bi-directional and must store a large buffer of frames. For example, the encoder must store and re-order I-frame 252 before P-frame 254; both B-frame 256 and B-frame 258 will each separately refer to I-frame 252 and P-frame 254. While this example depicts encoding, analogous re-ordering must occur at the decoder. In other words, the codecs must maintain two separate "orders" or "queues" in their memory-one queue for display, and another queue for encoding/decoding. Due to the re-ordering requirements, bi-directional coding greatly affects the memory usage and latency of codecs.

Notably, many commodity codec implementations do not need the full group of pictures (GOP). For example, the look-forward prediction of video compression scheme 200 only requires one frame (only I-frame 202 is needed for P-frame 204, only P-frame 204 is needed for P-frame 206, etc.). Similarly, the bi-directional prediction of video compression scheme 250 only requires two frames (only I-frame 252 is needed for P-frame 254, only I-frame 252 and P-frame 254 are needed for B-frame 256 and B-frame 258, etc.). As a result, most codecs are only sized for one or two reference frames.

While the present discussion is described in the context of "frames", artisans of ordinary skill in the related arts will readily appreciate that the techniques described throughout may be generalized to any spatial and/or temporal subdivision of media data. For example, the H.264/MPEG-4 AVC video coding standard (*Advanced Video Coding for Generic Audiovisual Services*, published August 2021, and incorporated herein by reference in its entirety), provides prediction within "slices" of a frame. A slice is a spatially distinct region of a frame that is encoded separately from other regions of the same frame. I-slices only use macroblocks with intra-prediction, P-slices can use macroblocks with intra- or inter-prediction. So-called "switching P-slices" (SP-slices) are like P-slices and "switching I-slices" (SI-slices) are similar to I-slices, however corrupted SP-slices can be replaced with SI-slices—this enables random access and error recovery functionality at slice granularity.

An "instantaneous decoder refresh" (IDR) frame is a special type of I-frame that specifies that no frame after the IDR frame can reference any previous frame. During operation, an encoder can send an IDR coded picture to clear the contents of the reference picture buffer. On receiving an IDR coded picture, the decoder marks all pictures in the reference buffer as "unused for reference." In other words, any subsequently transmitted frames can be decoded without reference to frames prior to the IDR frame. Notably, IDR frames can only contain I-slices or SI-slices.

Figure 3:
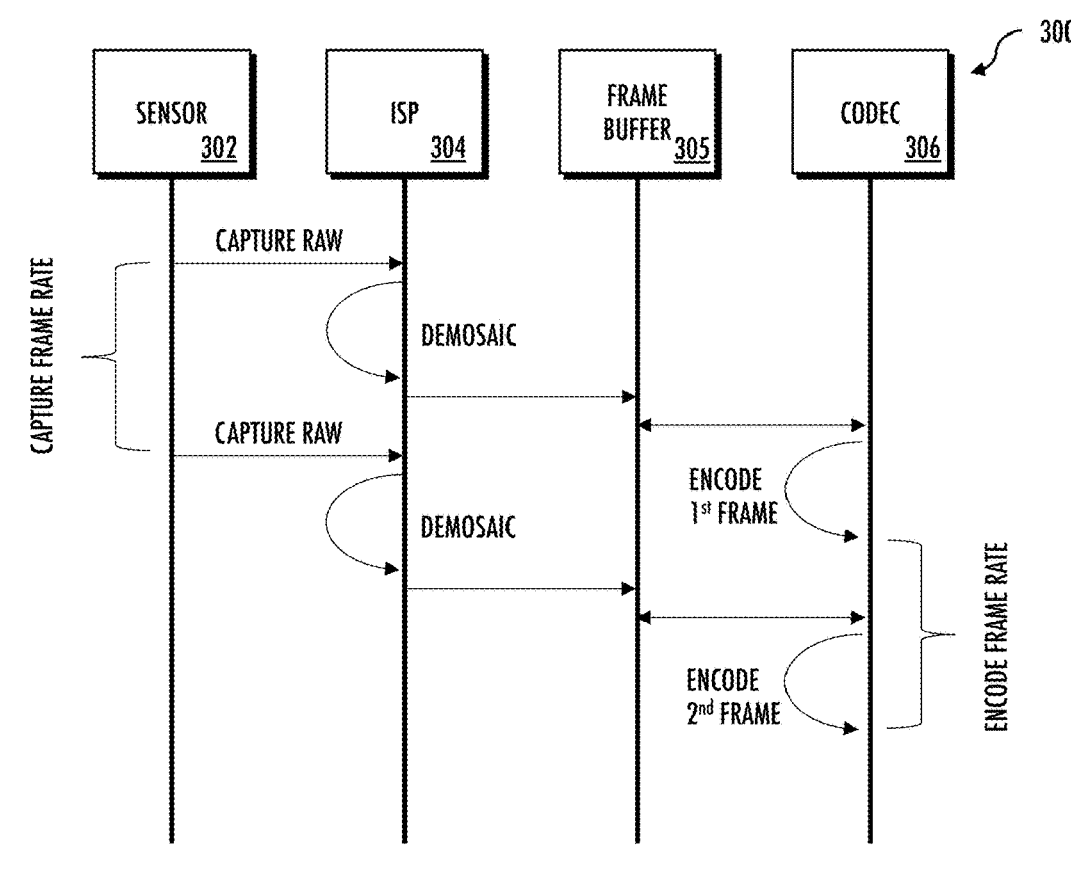
FIG. 3 provides a ladder diagram of selected component interactions within a camera, and a logical flow of the steps involved in video encoding, useful in explaining how MPEG codecs leverage the spatial and temporal similarities between frame types within the group of pictures (GOP).
Figure 3:
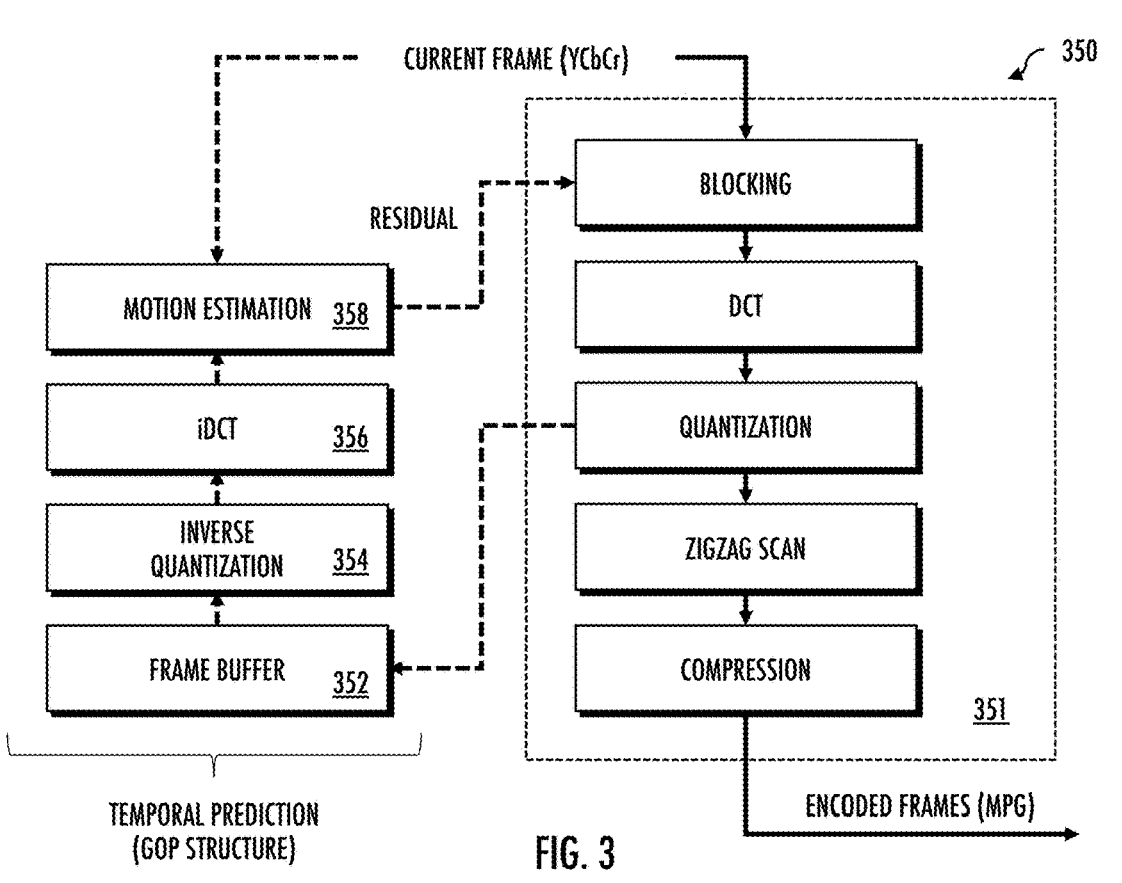

FIG. 3 provides a ladder diagram 300 of selected component interactions within a camera, and a logical flow 350 of the steps involved in video encoding, useful in explaining how MPEG codecs leverage the spatial and temporal similarities between frame types within the group of pictures (GOP).

During video operation, a camera sensor 302 captures raw light information at multiple capture times, based on a capture frame rate. In this illustrated example, only two captures are shown for clarity—however, video requires many more captures for any meaningful duration. Historically, US cinematic cameras captured at 24 frames per second (fps), whereas consumer electronics commonly use 30 fps, 60 fps, 120 fps, etc. Other countries may use different frame rates as well (e.g., 25 fps, 50 fps, 100 fps, etc.).

Importantly, video processing has several important differences from image processing. Much like image captures, the image signal processor 304 converts raw light information into image data (e.g., demosaic, white balance, color correction, etc.). However, while differences in exposures may not be obvious when considered in isolated images, they may be readily perceived when viewed across frames of video. Large shifts in exposure settings between frames can also increase the complexity and decrease the quality of temporal prediction (which adds to processing complexity). Thus, the image signal processor 304 may moderate and adjust exposure settings between frames of video to e.g., improve downstream processing and quality.

Furthermore, video processing also may impose significant scheduling constraints. Frames are large data structures that are difficult to process. Processing complexity can also significantly vary based on GOP frame type (e.g., different prediction search space, etc.). Thus, many implementations use a frame buffer 305 to store frames for prediction, as well pipeline management. This give the codec some scheduling flexibility; e.g., it can take longer to encode some frames and catch-up on other frames, so long as the overall pipeline does not overflow.

Referring back to FIG. 3, the codec 306 compresses multiple frames into video. Some video encoding implementations are not constrained by time or processing power—these encoding technologies are typically found in content delivery networks which encode at best effort once and deliver many times. However, most consumer electronics applications must operate within device constraints and/or user application constraints. As but one such example, an action camera may have limited onboard space—thus, it may need to use compress video as it is being captured so as to enable longer captures. In other words, the encode rate must keep up with the capture rate. As another such example, live streaming applications must encode and stream during capture—i.e., the encode rate and transmission rate, must keep up with the capture rate. Here, in the example depicted in FIG. 3, the $1^{st}$ frame encode completes before the $2^{nd}$ frame encode begins; this means the encode frame rate must be, on average, at least as fast as the capture frame rate.

As shown in logical flow 350, MPEG encoding has many similar components to JPEG encoding (steps represented by box 351); in many cases, the same codec implementation may be capable of either and/or used for both. In fact, certain processes of MPEG encoding may be re-used with minor modification (e.g., changes to parameters, etc.) for spatial prediction. However, video coding does implement additional steps for temporal prediction across the frames of the group of pictures (GOP).

Initially, the first frame of image data is processed through blocking, DCT, quantization, zigzag scan, and compression (steps represented by box 351). The initial frame does not make use of any temporal prediction, and may be encoded as an I-frame of the GOP. The initial frame is then stored to the frame buffer (step 352) for temporal prediction in subsequent frame encoding.

For each subsequent frame, one or more frames are retrieved from the frame buffer for temporal prediction. Note that the encoding order of frames may not be sequential (see e.g., encode orders described in FIG. 2, above). Look-forward prediction may only retrieve previous frames, look-backward prediction may retrieve subsequent and/or previous frames.

At step 354, the quantized frame coefficients are inverted to bring the data to full precision (with some rounding loss). Then, at step 356, the frame coefficients are transformed back to spatial data, using an inverse Discrete Cosine Transform (DCT). The resulting image is a retrieved frame at a specific time instant.

At step 356, pixel motion is estimated from the current frame (first time) and the retrieved frame (at a second time that could be previous or subsequent to the first time). Most codecs use a search window to balance accuracy against computational complexity; a diamond-shaped search window (Manhattan distance) or a circle-shaped search window (radial distance) are common. The search compares each block in the current frame to the blocks in the search window of the retrieved frame. Each blockwise pair is scored. A motion vector indicates the displacement from the position of the highest scoring block in the retrieved frame to the position in the current frame.

Differences between the matching block in the retrieved frame and the current block are called the "residual" (step 358). The residual is encoded and transmitted along with the motion vector. Ideally, the residual contains much less information than the original block, this savings results in temporal compression.

As a completely separate, but important tangent, commodity codecs are optimized for the most common usage scenarios. Typically, they are designed to operate independently from other logic to minimize external burden and also to tightly control its own operation. For example, most conventional codecs "open" a video data structure during encoding and "close" the video data structure after the encoding process is complete. While the file is open, other processes cannot access the data—this is to ensure that the codec does not need to check for race conditions, shared file pointers, etc. Additionally, since codecs often must service multiple different applications, they "flush" their pipeline after task completion to avoid cross-contamination.

Exemplary Timelapse Encoding Techniques

Timelapse photography involves capturing a sequence of images at set intervals over a period of time and then playing them back at a higher speed. Since the playback rate is much faster than the rate at which the photos were taken, time appears to be sped up. For example, if photos are taken every minute and played back at 30 frames per second, 30 minutes of real time will be shown in just one second of video.

Unfortunately, timelapse photography introduces a variety of problems that conventional photography does not have. First, power consumption is significant; keeping the camera on for the entire time lapse duration takes power— the long shooting duration and low capture rate means that timelapse photography is often limited by battery life, rather than storage space. Secondly, light is captured based on exposure settings and incorrect exposure settings cannot be corrected after capture. While standard video capture only needs to check exposure settings once, timelapse captures cannot rely on one exposure measurement, and usually take the additional step of "smoothing" exposure settings (timelapse smoothing). Furthermore, many timelapse captures are plagued by otherwise avoidable errors—users cannot manually check an ongoing timelapse because handling the camera will impart camera movement on the resulting video. Commodity codec file handling limitations (e.g., open files cannot be accessed without closing and purging the pipeline) also prevent touchless checking from a tethered device.

Exemplary embodiments of the present disclosure capture light information in a power efficient manner and encode them in bulk (a video segment at a time). In some variants, the light information may be stored as raw data; in other variants, the light information may be stored as compressed images. The segment-based encoding has the additional benefit of creating identifiable breakpoints that allow for file access without interfering with the capture; this may be used to check the status of the video mid-recording.

Figure 4:
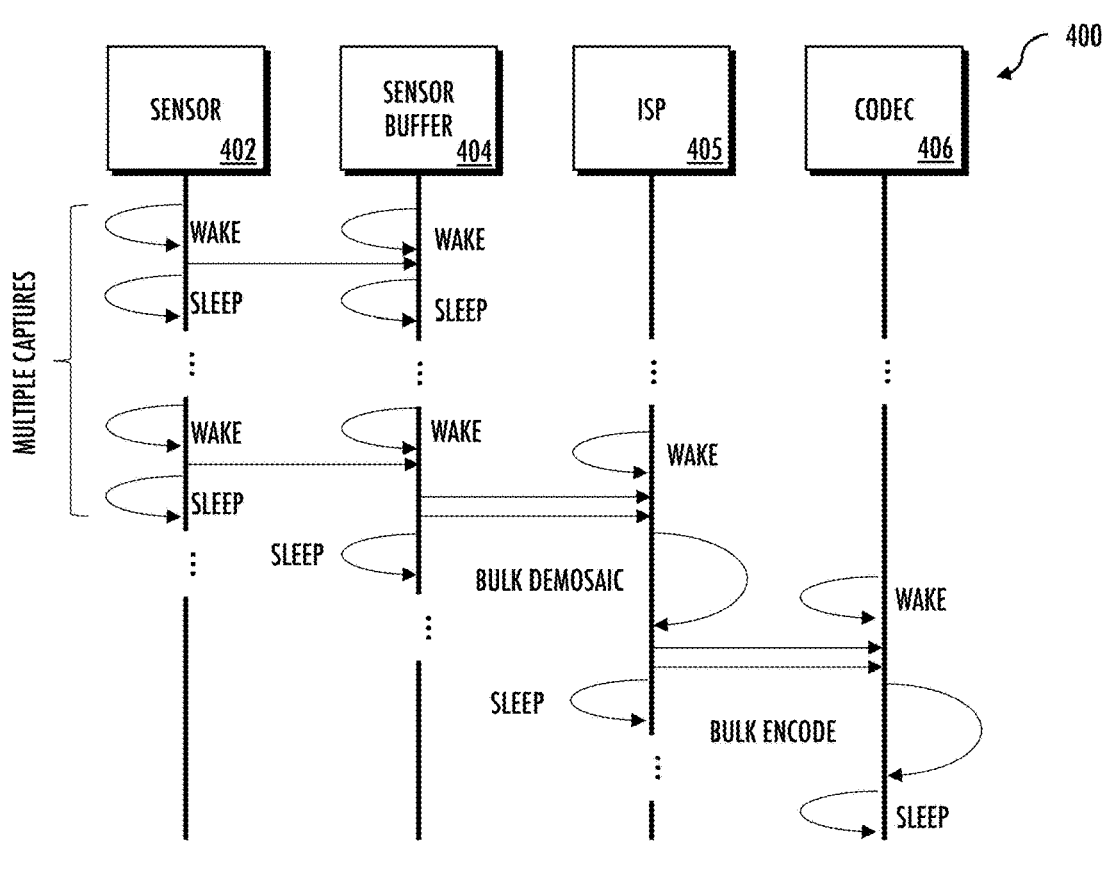
FIG. 4 is a ladder diagram of selected component interactions within a camera, and a logical flow of the steps involved in a first exemplary video encoding scheme, in accordance with various aspects of the present disclosure.
Figure 4:
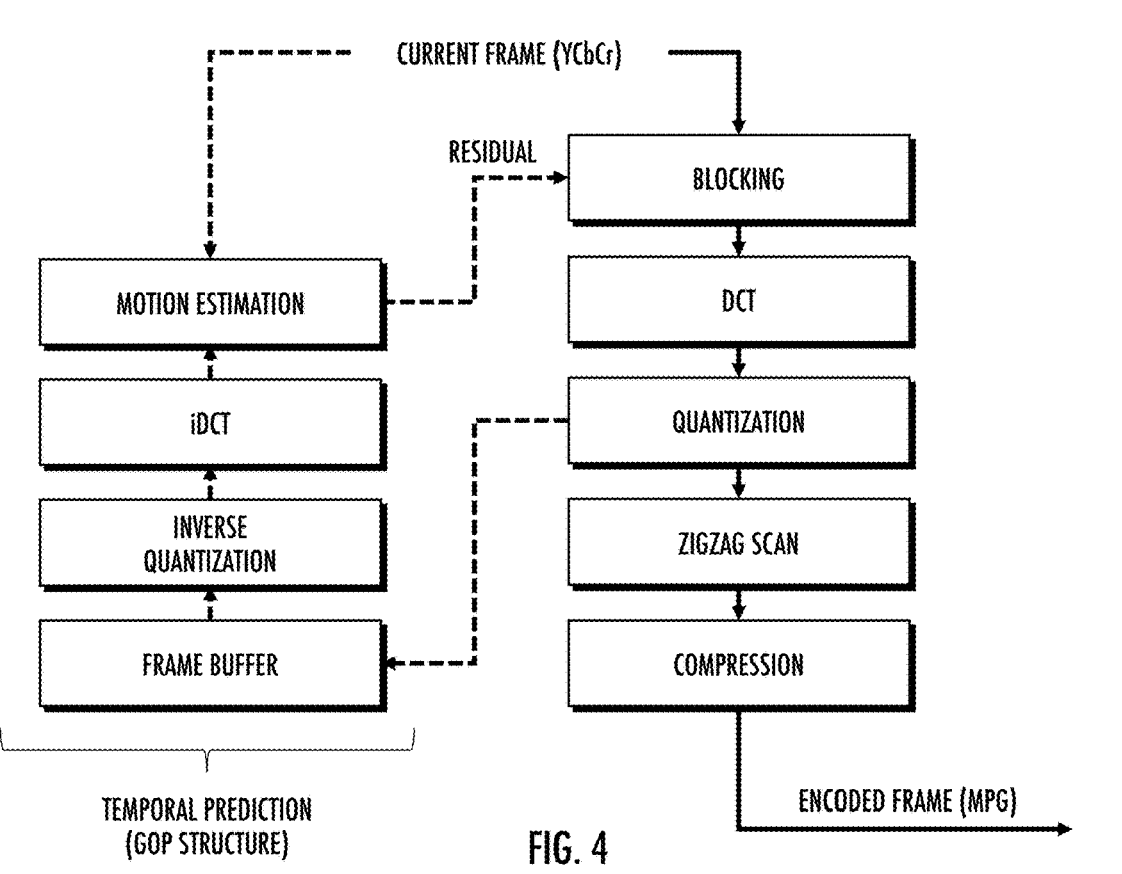

FIG. 4 provides a ladder diagram 400 of selected component interactions within a camera, and a logical flow 450 of the steps involved in a first exemplary video encoding scheme, in accordance with various aspects of the present disclosure.

In one exemplary embodiment, a power management state machine selectively powers (or "wakes") the components as needed. Other components are kept in a "sleep" state. Sleep states greatly reduce the component's power draw (little to none) between captures.

In this example, the power management state machine wakes the camera sensor 402 and camera sensor buffer 404 based on a timelapse capture frame rate. The camera sensor 402 checks the exposure setting and updates exposure parameters before capturing raw light information. The captured raw light information is written to a sensor buffer 404. Then, the power management state machine puts the camera sensor 402 and camera sensor buffer 404 to sleep until the next capture time.

After a number of captures have occurred, the power management state machine wakes the ISP 405 and codec 406 to perform image signal processing and encoding. These operations are decoupled from capture timing, and can occur in bulk and/or at best-effort with variable scheduling. More directly, processing can complete with as little (or as much) time as needed, and logic can be put to sleep once tasks are complete (idle and/or wait is unnecessary).

In one specific implementation, the number of captures is based on the number of frames in a group of pictures (GOP). Bulk encoding the GOP ensures that the resulting video segment is self-contained (e.g., the GOP's has at least one IDR frame that is referred to by all other frames). Segmenting the video encoding at GOPs also means that the existing data within the codec pipeline will be not used for the next GOP; thus, file accesses can be relaxed. In other words, the GOP can be accessed without causing race conditions, or needing shared file pointers, etc.

As but one such illustrative example, consider a GOP that has 24 frames for each second of video (24 fps). First, 24 captures are performed; at each capture interval, the sensor 402 and buffer 404 wake-up to capture and store the raw light information and then return to sleep. When all 24 images are captured, the ISP 405 is woken to bulk demosaic all 24 images at once, the resulting images are then provided to an encoder for a bulk encode. Other frame rates and/or GOP structures may be substituted with equal success.

Different file handling may be used, depending on usage. The resulting segment of encoded video may be appended to an accumulated timelapse video which is kept open; the file structure can be closed after the timelapse concludes. Alternatively, the timelapse video may be opened, appended with the new segment, and closed. In some implementations, the camera may transfer the segment of encoded video to another device (e.g., a tethered smartphone) to update a running accumulation of the timelapse video. This may be particularly handy for "touchless" monitoring.

After ISP and encoding, the sensor buffer (and any derived files) can be deleted to make space for the next set of captures. In some cases, certain types of metadata may be retained for continuity; for example, exposure settings may be stored as a metadata track to assist in timelapse exposure smoothing for the next segment.

Conceptually, task scheduling may be adjusted to e.g., improve performance, reduce power consumption, adjust responsiveness, etc. Typically, a codec that is actively encoding video consumes a large amount of power ("active" state); the codec may also have progressively lower power "idle" states and "sleep" states. Idle states may keep the codec ready to immediately transition to active encoding, whereas sleep states may have a wake-up lag. Depending on timing, the codec may be held in idle or put to sleep between bulk encodes. For example, very long capture intervals with very large GOPs may greatly benefit from putting the codec to sleep. In contrast, short capture intervals with short GOPs may idle the codec, since churning between active and sleep states may be counterproductive. Some implementations may even select between idle and sleep modes based on other device considerations—for example, low power operation may greatly prefer sleeping between encodes, whereas motion-triggered captures may have to idle in order to guarantee capture.

The first exemplary video encoding scheme of FIG. 4 may be implemented with minor modifications (if any) to existing apparatus. For example, the camera sensor buffer 404 may need to be increased (or resolution reduced) to fit the captured amount of raw light information. Similarly, power management state machine and timer functionality are needed to control the various components, as decoupled from capture timing. Other modifications may be handled in firmware/software e.g., exposure ramping, task scheduling, etc. However, more aggressive savings may be had by leveraging the similarities in JPEG and MPEG encoding to adjust codec operation.

Figure 5:
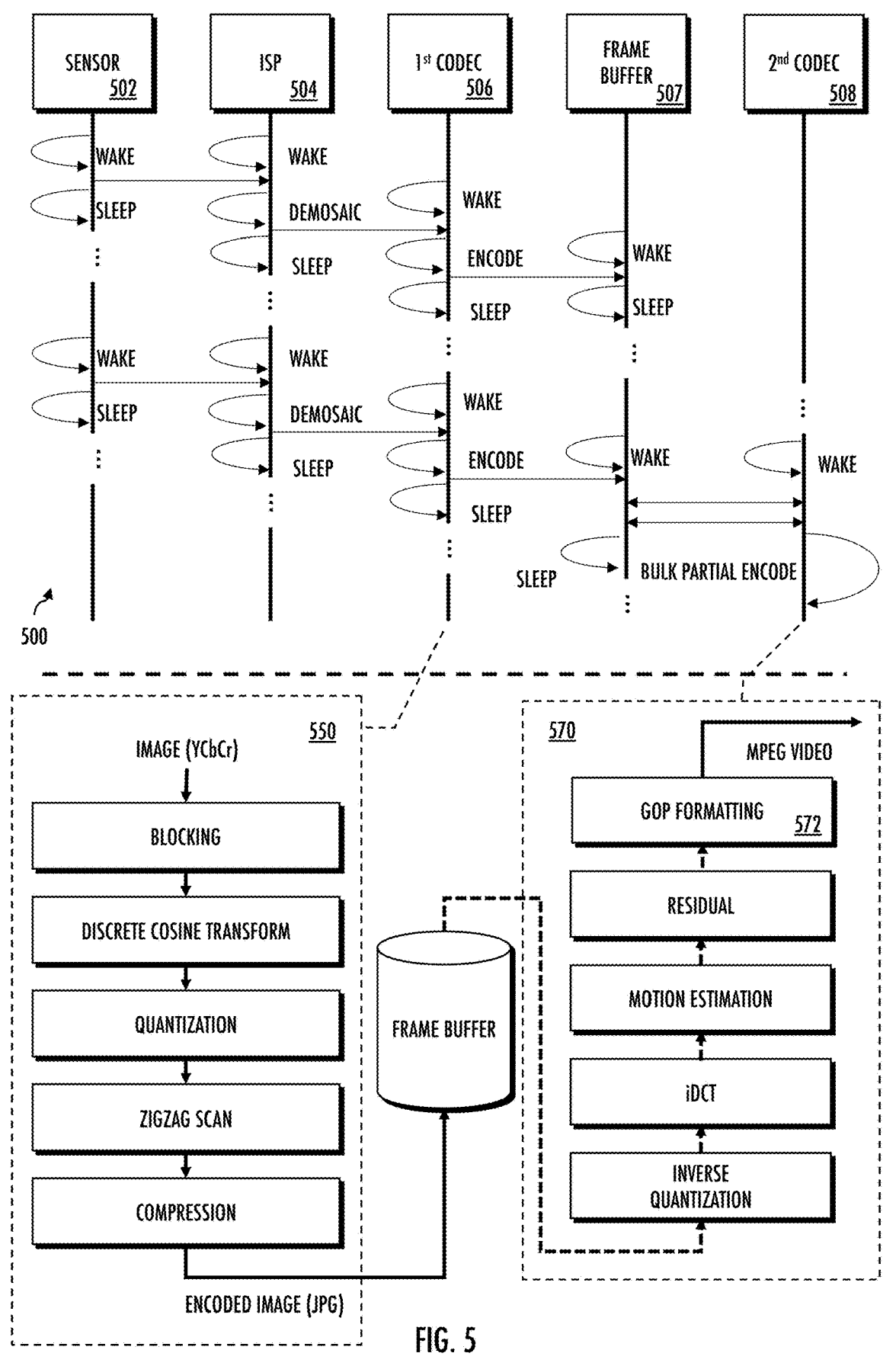

FIG. 5 provides a ladder diagram 500 of selected component interactions within a camera, and a logical flow 550 of the steps involved in a second exemplary video encoding scheme, in accordance with various aspects of the present disclosure.

Much like the foregoing scheme of FIG. 4, a power management state machine selectively powers (or "wakes") the components as needed. In this example, however, the power management state machine wakes the camera sensor 502, image signal processor 504, first codec 506, and frame buffer 507, based on a timelapse capture frame rate. The camera sensor 502 checks the exposure setting and updates exposure parameters before capturing raw light information. The captured raw light information is then immediately processed by the image signal processor 504 to create YCbCr image data, and the first codec 506 encodes the images as JPEG images (see logical flow 550). The JPEG images are written to the frame buffer 507. Then, the power management state machine puts the components to sleep until the next capture time.

After a number of images have been stored, the power management state machine wakes a second codec 508 to convert the JPEG images to an MPEG video segment (which may be appended to the timelapse video) according to the process of box 570.

Here, consider a GOP that has 24 frames for each second of video (24 fps). First, 24 captures are performed; at each capture interval, the sensor 502, image signal processor 504, and first codec 506, wake-up for each capture to capture, demosaic, encode, and store an image to the frame buffer 507, and then return to sleep. When all 24 images are captured, the second codec is woken to bulk partial encode the GOP.

Unlike the standard MPEG encoding process, the JPEG to MPEG conversion can skip many of the steps (logical flow 550) that were performed during JPEG coding. Instead, JPEGs can be retrieved from the frame buffer 507 and inverted (inverse quantization, inverse DCT) to create reference images. The reference images are then re-compressed according to the GOP frame structure, based on motion estimation and residual calculations (step 572). For example, a first JPEG may be identified as the IDR-frame; the image data of the first JPEG is compared to the image data of a second JPEG to derive the motion estimation and residual calculations. This temporal compression information is then used to generate the corresponding P-frame; similar processing may be used to generate B-frames from JPEG images.

Importantly, the second exemplary video encoding scheme of FIG. 5 performs more processing at capture (e.g., image signal processing and encoding), however, the relative difference in timescale (milliseconds versus seconds, minutes, hours or even days) means that these operations may still benefit from best-effort, variable scheduling, and avoid idle/wait cycles.

While the frame buffer 507 stores all the JPEGs between encoding (as compared to commodity codec buffers which only store 1 or 2), the JPEGs are a compressed format that allows for a much smaller memory footprint (e.g. 6:1, 12:1, 10:1, 20:1, etc.). Furthermore, while the frame buffer 507 stores all of the intermediary JPEG images, a wider set of memory technologies may be used due to the relaxed timing constraints. For example, the frame buffer 507 may use non-volatile Flash that has slower access times relative to volatile RAM; advantageously, non-volatile memories can store data without power, whereas volatile memories must be periodically refreshed to avoid decay.

As previously alluded to, task scheduling may be adjusted to e.g., improve performance, reduce power consumption, adjust responsiveness, etc. In this case, two codecs may each have different considerations. The first codec only encodes images and the second codec can re-use a significant portion of the first codec's output; each codec does less than a conventional video codec. Here, the first codec 506 may be kept idle (or slept) between captures based on the capture timing—longer capture intervals may warrant sleep states, shorter capture intervals may be better served with idle states. Similarly, the second codec may be kept idle (or slept) depending on how many images are in a GOP. Various other scheduling configurations may be substituted with equal success.

While the foregoing discussion is presented in the context of timelapse, the concept of decoupling capture timing from encode timing may be broadly extended to other time-distortion schemes (e.g., slow-motion, etc.).

System Architecture

Figure 6:
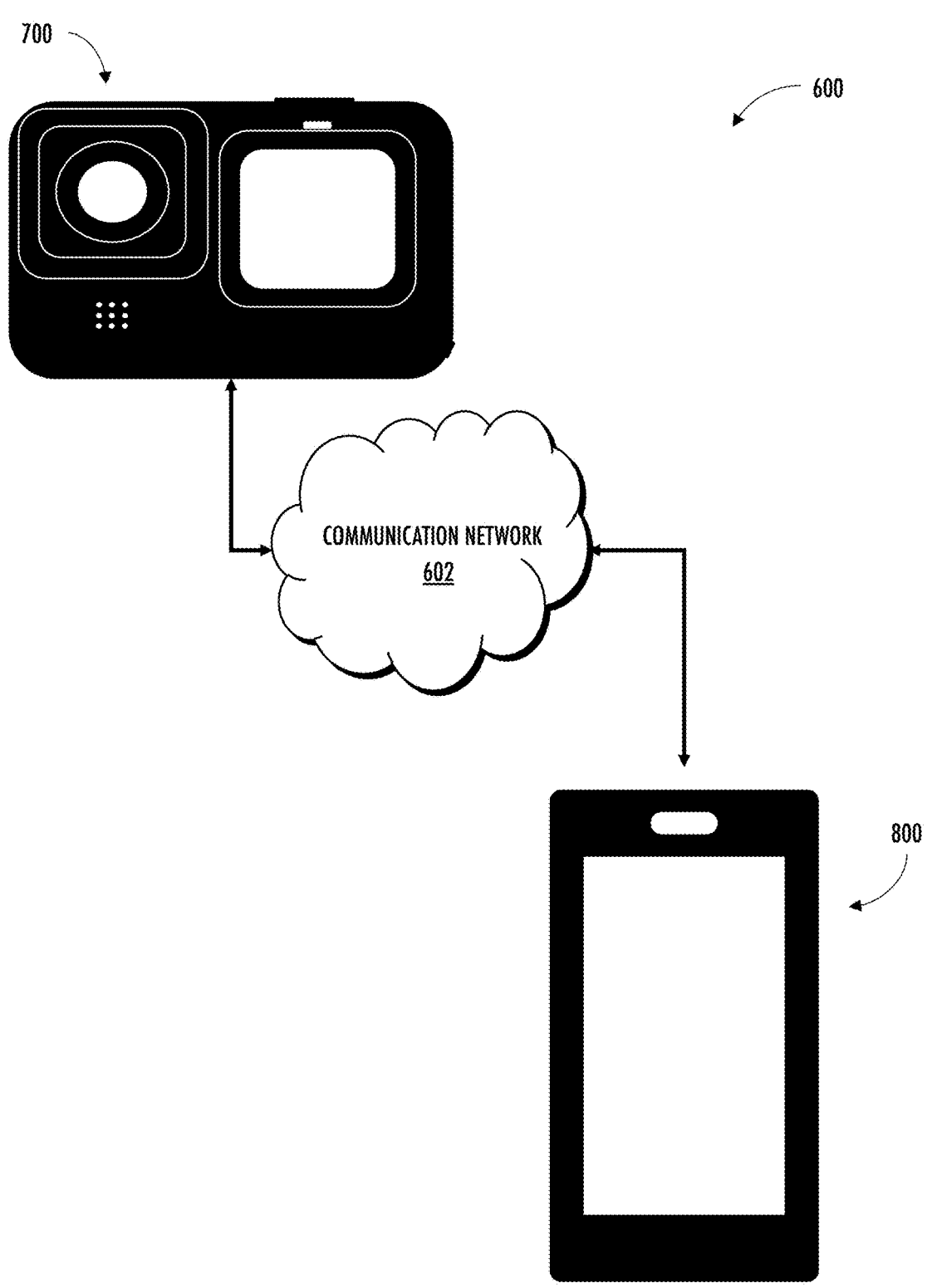
FIG. 6 is a logical block diagram of the exemplary system that includes: an encoding device, a decoding device, and a communication network.

FIG. 6 is a logical block diagram of the exemplary system 6000 that includes: an encoding device 700, a decoding device 800, and a communication network 602. The encoding device 700 may capture data at a first rate and encode the captured data at a second rate different than the first rate. In some cases, the encoded data may be transferred to the decoding device 800 directly or via communication network 602.

While the following discussion is presented in the context of an encoding device 700 and a decoding device 800, artisans of ordinary skill in the related arts will readily appreciate that the techniques may be broadly extended to other topologies and/or systems. For example, the encoding device may transfer timelapse encoded video segments to a server for one or more clients. As another example, a capture device may capture media at a first rate which is provided to an encoding device for encoding at a second rate different than the first rate.

The following discussion provides functional descriptions for various logical entities of the exemplary system 600. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 600 is separately provided below.

Encoding Device

Functionally, an encoding device 700 captures a sequential set of images, bulk encodes the set of images as a segment, and appends the segment to a video. Here, image information may include raw light information, display formatted images (e.g., two-dimensional tuples of chrominance and/or luminance, etc.), and/or compressed image formats. In one aspect of the present disclosure, the segment encoding is decoupled from the capture rate/timing. An another aspect, portions of encoding may be split into one or more stages e.g., a first intermediary image stage and a second image to video stage, etc.

The techniques described throughout may be broadly applicable to encoding devices such as cameras including action cameras, digital cameras, digital video cameras; cellular phones; laptops; smart watches; and/or IoT devices. For example, a smart phone or laptop may be able to capture and process video. Various other applications may be substitute with equal success by artisans of ordinary skill, given the contents of the present disclosure.

Figure 7:
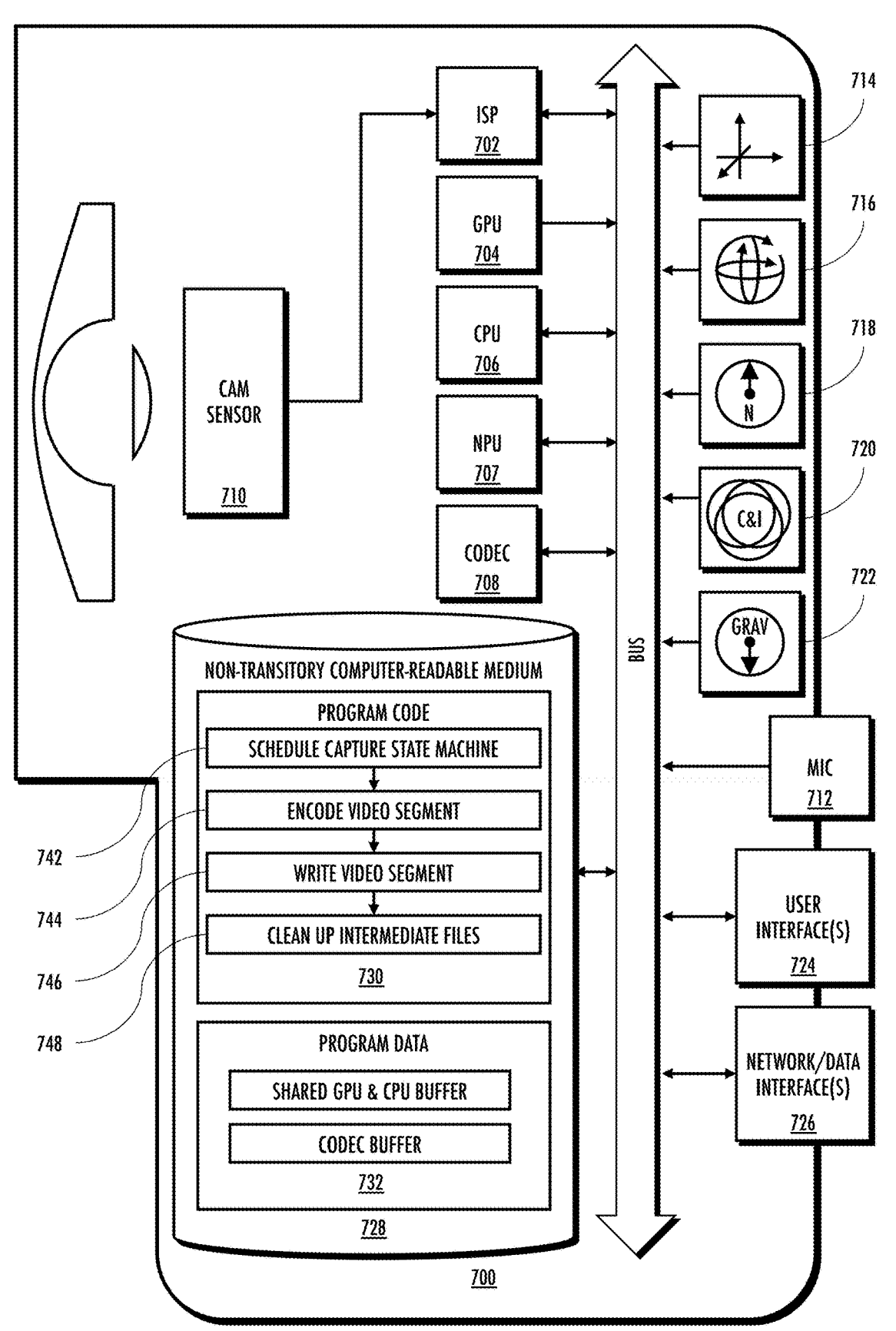
FIG. 7 is a logical block diagram of an exemplary encoding device.

FIG. 7 is a logical block diagram of an exemplary encoding device 700. The encoding device 700 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary encoding device 700.

As used herein, the term "real-time" refers to tasks that must be performed within definitive constraints; for example, a video camera must capture each frame of video at a specific rate of capture (e.g., 30 frames per second (fps)). As used herein, the term "near real-time" refers to tasks that must be performed within definitive time constraints once started; for example, a smart phone may use near real-time rendering for each frame of video at its specific rate of display, however some queueing time may be allotted prior to display.

Unlike real-time tasks, so-called "best-effort" refers to tasks that can be handled with variable bit rates and/or latency. Best-effort tasks are generally not time sensitive and can be run as low-priority background tasks (for even very high complexity tasks), or queued for cloud-based processing, etc.

Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 710, a microphone 712, an accelerometer (ACCL 714), a gyroscope (GYRO 716), and a magnetometer (MAGN 718).

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the encoding device 700. In other embodiments, the sensor subsystem may be augmented by external devices and/or removably attached components (e.g., hot-shoe/cold-shoe attachments, etc.) The following sections provide detailed descriptions of the individual components of the sensor subsystem.

In one exemplary embodiment, a camera lens bends (distorts) light to focus on the camera sensor 710. In one specific implementation, the optical nature of the camera lens is mathematically described with a lens polynomial.

More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 710 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to) 90° and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for $\frac{1}{24}^{th}$ of a second. Similarly, 120 FPS using a 360° shutter angle exposes the photosensitive sensor $\frac{1}{120}^{th}$ of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $\frac{1}{48}^{th}$ of a second at 24 FPS. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

In one specific implementation, the microphone 712 senses acoustic vibrations and converts the vibrations to an electrical signal (via a transducer, condenser, etc.) The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

The inertial measurement unit (IMU) includes one or more accelerometers, gyroscopes, and/or magnetometers. In one specific implementation, the accelerometer (ACCL 714) measures acceleration and gyroscope (GYRO 716) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 720). In one specific implementation, the magnetometer (MAGN 718) may provide a magnetic north vector (which may be used to "north lock" video and/or augment location services such as GPS), similarly the accelerometer (ACCL 714) may also be used to calculate a gravity vector (GRAV 722).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Buffer Implementations and Design Considerations

Various embodiments of the present disclosure use memory buffers for temporary storage of image data during operation. A memory buffer is a memory used to temporarily hold data while it is being written, transferred, processed, or otherwise manipulated. Buffers are often used to compensate for differences between data rates; e.g., to decouple capture rates from encoding rates, etc.

Physically, a variety of different memory technologies may be used for buffers. So-called "volatile" memories refer to memories that require some amount of power to maintain the stored information. Volatile memories are often used in applications where performance is prioritized over power consumption. Examples of volatile memory technologies include RAM (Random Access Memory), dynamic RAM (DRAM), and static RAM (SRAM), etc. "Non-volatile" memories refer to memories that can retain data even when unpowered; non-volatile memories are typically slower than volatile memories and used where data must be stored for long periods of time. Examples of non-volatile memories include e.g., ROM (Read-Only Memory), EEPROM (Electrically Erasable Programmable Read-Only Memory), Flash Memory, SSD (Solid-State Drive), etc.

Buffer may be configured to optimize for certain types of memory accesses. For example, a linear buffer may provide a contiguous block of memory that can be efficiently accessed in a sequential manner. Circular buffers use a set of wrapping pointers to implement an efficient first-in-first-out (FIFO) style queue of fixed size. Last-in-first-out (LIFO) buffers are less common, but may be found in certain types of specialized compute (e.g., stack data structures). Other buffer structures may include alternating/switching buffers (e.g., double buffers, triple buffers, etc.) and/or ping-pong buffers.

Within the context of the present disclosure, buffers may be used to store raw light information, display formatted images (e.g., two-dimensional tuples of chrominance and/or luminance, etc.), and/or compressed image formats. As previously alluded to, decoupling different stages of image processing and/or encoding from the capture timing may introduce significant differences in data rates and/or bursty behavior. In some cases, this may require larger buffer sizes and/or intermediary buffers within the capture and/or encoding pipeline.

In some embodiments, the size of the intermediary buffers may limit the number of captures and/or the amount of data that is encoded in bulk. By extension this may also impose limitations on the group of picture (GOP) structure and/or video segment size. While real-time system performance is usually constrained by physical memory, various embodiments of the present disclosure may enable best-effort operations—this may relax timing constraints enough to allow virtual memory and/or memory swapping techniques. Certain embodiments may also leverage memory technologies (e.g., non-volatile memories for unpowered storage) and/or buffer organization (e.g., double and/or triple buffers for prediction) to achieve further processing efficiencies and/or operational improvements.

User Interface Subsystem

Functionally, the user interface subsystem 724 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 724 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 724 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 724 is an integral part of the encoding device 700. In other embodiments, the user interface subsystem may be augmented by external devices (such as the decoding device 800, discussed below) and/or removably attached components (e.g., hot-shoe/cold-shoe attachments, etc.) The following sections provide detailed descriptions of the individual components of the sensor subsystem.

In some embodiments, the user interface subsystem 724 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 724 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many BLE applications may be triggered by a physical button press to further reduce GUI power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 726 may include network interfaces including, but not limited to: Wi-Fi, Bluetooth, Global Positioning System (GPS), USB, and/or Ethernet network interfaces. Additionally, the network/data interface 726 may include data interfaces such as: SD cards (and their derivatives) and/or any other optical/electrical/magnetic media (e.g., MMC cards, CDs, DVDs, tape, etc.)

The communication subsystem including the network/data interface 726 of the encoding device 700 may include one or more radios and/or modems. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

As previously noted, communication subsystem with network/data interface 726 may include wireless subsystems (e.g., $5^{th}/6^{th}$ Generation (5G/6G) cellular networks, Wi-Fi, Bluetooth (including, Bluetooth Low Energy (BLE) communication networks), etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

The communication subsystem of the encoding device 700 may include one or more data interfaces for removeable media. In one exemplary embodiment, the encoding device 700 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.) Furthermore, the techniques described throughout may be applied with equal success to optical media (e.g., DVD, CD-ROM, etc.).

More generally, any scheme for storing data to non-transitory media may be substituted with equal success for any of the foregoing tasks.

Power Management Subsystem

The power management subsystem provides power to the system. Typically, power may be sourced from one or more power sources. Examples of power sources may include e.g., disposable and/or rechargeable chemical batteries, charge storage devices (e.g., super/ultra capacitors), and/or power generation devices (e.g., fuel cells, solar cells). Rechargeable power sources may additionally include charging circuitry (e.g., wired charging and/or wireless induction). In some variants, the power management subsystem may additionally include logic to control the thermal exhaust and/or power draw of the power sources for wearable applications.

During operation, the power management subsystem provides power to the components of the system based on their power state. In one exemplary embodiment, the power states may include an "off" or "sleep" state (no power), one or more low-power states, and an "on" state (full power). Transitions between power states may be described as "putting to sleep", "waking-up", and their various linguistic derivatives.

As but one such example, a camera sensor's processor may include: an "off" state that is completely unpowered; a "low-power" state that enables power, clocking, and logic to check interrupts; and one or more capture power states (e.g., reduced resolution capture, high resolution capture, etc.). During operation, another processor may "awaken" the camera sensor's processor by providing power via the power management subsystem. After the camera sensor's processor enters its low-power state, it services the interrupt; if a capture is necessary, then the camera sensor's processor may transition from the "low-power" state to one of its various capture states.

Various other power management subsystems may be substituted with equal success, given the contents of the present disclosure.

Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 7, the control and data subsystem may include one or more of: a central processing unit (CPU 706), an image signal processor (ISP 702), a graphics processing unit (GPU 704), a codec 708, and a non-transitory computer-readable medium 728 that stores program instructions and/or data. In some implementations, a neural network processing unit (NPU 707) may additionally be included for machine-learning applications.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 7) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or auto exposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

As a practical matter, a hardware codec is an single block that includes encoder and decoder logic. Typically, both encoder and decoder logic have physically dedicated logic but may also share common hardware (e.g., DMA channels, etc.). Some implementations may allow portions of the logic to be independently powered (e.g., an encoder-only mode, a decoder-only mode, etc.); other implementations may provide more fine-grained control e.g., enabling specific data and/or control paths, etc. A single codec may support multiple different media formats (e.g., H264, H265, HEVC, etc.) by adjusting the encoding/decoding parameters. More generally, artisans of ordinary skill in the related arts will readily appreciate that a "codec" may refer to any codec-like logic. A codec may refer to a hardware codec, a software codec (designed to emulate the functionality of a hardware codec), and/or any functional portion thereof (e.g., an encoder, decoder, etc.).

Other processor subsystem implementations may multiply, combine, further sub-divide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the encoding device 700. In one exemplary embodiment, data may be stored as non-transitory symbols (e.g., bits read from non-transitory computer-readable mediums.) In one specific implementation, the memory subsystem including non-transitory computer-readable medium 728 is physically realized as one or more physical memory chips (e.g., NAND/NOR flash) that are logically separated into memory data structures. The memory subsystem may be bifurcated into program code 730 and/or program data 732. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the encoding device 700 as firmware. In other embodiments, the program code may be dynamically stored (and changeable) via software updates. In some such variants, software may be subsequently updated by external parties and/or the user, based on various access permissions and procedures.

Bulk Segment Encoding Functionality

In one embodiment, the non-transitory computer-readable medium includes a routine that captures a sequential set of images, encodes the set of images as a segment, and appends the segment to a video. When executed by the control and data subsystem, the routine causes the decoding device to: schedule sensor captures, encode video segments, and write video segments to a video file. In some variants, the routine may additionally clean up intermediate files to free resources for additional captures.

In step 742, the encoding device schedules a capture state machine. In one embodiment, the capture state machine is configured to wake the camera sensor for each interval of a timelapse capture. In some variants, the capture state machine may be further configured to wake associated buffers, image signal processors (ISPs), and/or codecs according to the capture interval. Furthermore, the capture state machine may be configured to put to sleep the camera sensor between capture intervals of a timelapse capture. In some variants, the capture state machine may also be further configured to put to sleep associated buffers, image signal processors (ISPs), and/or codecs according to the capture interval as well.

In some embodiments, the capture state machine divides a capture flow into multiple stages of operation. For example, the capture flow may have a number of captures and a single video encode stage. In another such example, the capture flow may have a number of captures and a image compression and a single image to video conversion stage. While the foregoing examples are described in the context of a single GOP, a segment of video might correspond to multiple GOPs and/or have multiple IDR frames. More generally, the capture flow may have any number of captures, conversions, manipulations, and/or encodings—the capture state machine coordinates the various components of the device such based on the capture schema (timelapse, slow-motion, user-triggered, etc.).

While the foregoing examples are discussed in the context of a time-based schedule, other types of scheduling may be substituted with equal success. For example, encoding may be scheduled to occur after a certain number of images are captured. Still other implementations may use other conditional events to trigger state changes—for example, changes may be based on detected events (e.g., movements, lighting changes, activity, user input, etc.). As but one such example, a stop-motion mode may allow a user to use another device (e.g., a smart phone) to trigger touchless captures.

The described capture state machine is implemented as part of the power management logic of the encoding device, to optimize for power consumption. More generally however, the concepts may be broadly extended to other applications. For example, a sensor-based capture state machine may allow the sensor to manage capture timing—this may be important for e.g., automatically shifting to slow-motion capture when sudden movement is detected.

In step 744, the encoding device encodes a video segment captured according to the capture state machine. In one specific embodiment, the encoding device performs a set of image captures before encoding a video segment. The video segment may be encoded using standard codec techniques (e.g., JPEG and/or MPEG encoding, etc.), or may modify the codec operation so as to avoid unnecessary and/or redundant steps (e.g., MPEG may not need to undo and repeat JPEG compression, etc.).

While the foregoing examples are discussed in the context of timelapse, artisans of ordinary skill in the related arts will appreciate that the state machine based capture mechanism may also be used in slow-motion captures with equal success. Notably, slow-motion captures capture action at a rate that is faster than the expected replay rate—thus, a slow-motion camera might be able to capture a large amount of slow motion footage and start encoding a segment at a time, rather than encoding the entire footage. This could be useful for certain types of footage (sudden action, punctuated by long periods of inactivity).

While the various embodiments discussed throughout are presented in the context of video, the concepts may be broadly applied to other forms of media (e.g., audio, etc.).

In step 746, the encoding device writes a video segment. In some embodiments, the video segment may be appended to a file that is left in an "open" state between captures. In other embodiments, the video file may be opened, appended to, and closed between captures. Still other implementations may transmit and/or stream video segments to other devices.

Most operating systems limit access to data structures (files) based on "open" and "closed" states. An open data structure is owned by a process, thread, program, or other logical entity, and may be accessed by its owner. A closed data structure is not owned by any process; the file must be opened to be accessed. A "file handle" (or file descriptor) is an identifier used to access an open data structure; closed files do not have valid file handles. An open file has been assigned resources (such as memory and buffers) in the operating system to manage the file. In some cases, an open file may have access restrictions (e.g., read-only, write-only, read-and-write, etc.) that are enforced by the operating system.

File handles are often used by operating systems to ensure that only a single logical entity has access to a data structure at a time. For example, a data structure that is opened by a codec typically (under normal circumstances) cannot be accessed by a separate entity (e.g., a modem, CPU, etc.). In some cases, special permissions may be granded to implement sharing of file handles between processes, etc. Various embodiments of the present disclosure may allow for shared file handles under special circumstances, based on the current capture state machine. For example, a codec may have access to write to a video segment, and a CPU may separately inspect the video segment; non-contentious access is implicitly enforced by the capture state machine (rather than explicitly enforced by the operating system).

In step 748, the encoding device may clean up intermediate files. Here, intermediate files refer to files which are created and/or modified as a result of the capture and/or encoding pipeline, which are not used for subsequent output. For example, a first codec of the pipeline may encode captured images to an intermediate compressed format (JPEG) for compression and storage; these intermediate compressed files may be converted to the output data structure (MPEG) at a later point. Since they are intermediate products, their resources may be freed as needed.

Neural Network and Machine Learning Implementations

Historically, machine-learning logic was often implemented as large vector-matrix operations which can be performed on specialized vector-matrix logic (such as might be found in the GPU). More recently, however, machine-learning logic may be implemented as a wholly separate logic specifically for accelerating neural network computations. Typically, the NPU includes hardware acceleration for highly parallelized matrix multiplication and non-linear processing (for activation functions).

Unlike traditional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time. Once the NPU has "learned" appropriate behavior, the NPU may be used in real-world scenarios. NPU-based solutions are often more resilient to variations in environment and may behave reasonably even in unexpected circumstances (e.g., similar to a human.)

While the foregoing discussions are presented in the context of a Turing-based processor-memory configuration, neural network and/or machine learning may be substituted with equal success by artisans of ordinary skill in the related arts.

Decoding Device

Functionally, a decoding device 800 refers to a device that can play video that is encoded by the encoding device 700. In some variants, the decoding device 800 may also be used to control operation of the encoding device 700; e.g., a smart phone application may be used to start timelapse capture, stop timelapse capture, adjust various timelapse parameters, and/or annotate the timelapse capture (e.g., identify specific frames as "highlights", key frames, etc.) without touching the encoding device 700 (e.g., "touchless" monitoring). The decoding device 800 may explicitly provide its component capabilities to the encoding device 700. For example, the decoding device 800 may advertise its parameters as part of the discovery, pairing, and/or configuration process, and/or feedback during a timelapse.

The decoding device 800 has many similarities in operation and implementation to the encoding device 700 which are not further discussed; the following discussion provides a discussion of the internal operations, design considerations, and/or alternatives, that are specific to decoding device operation.

Figure 8:
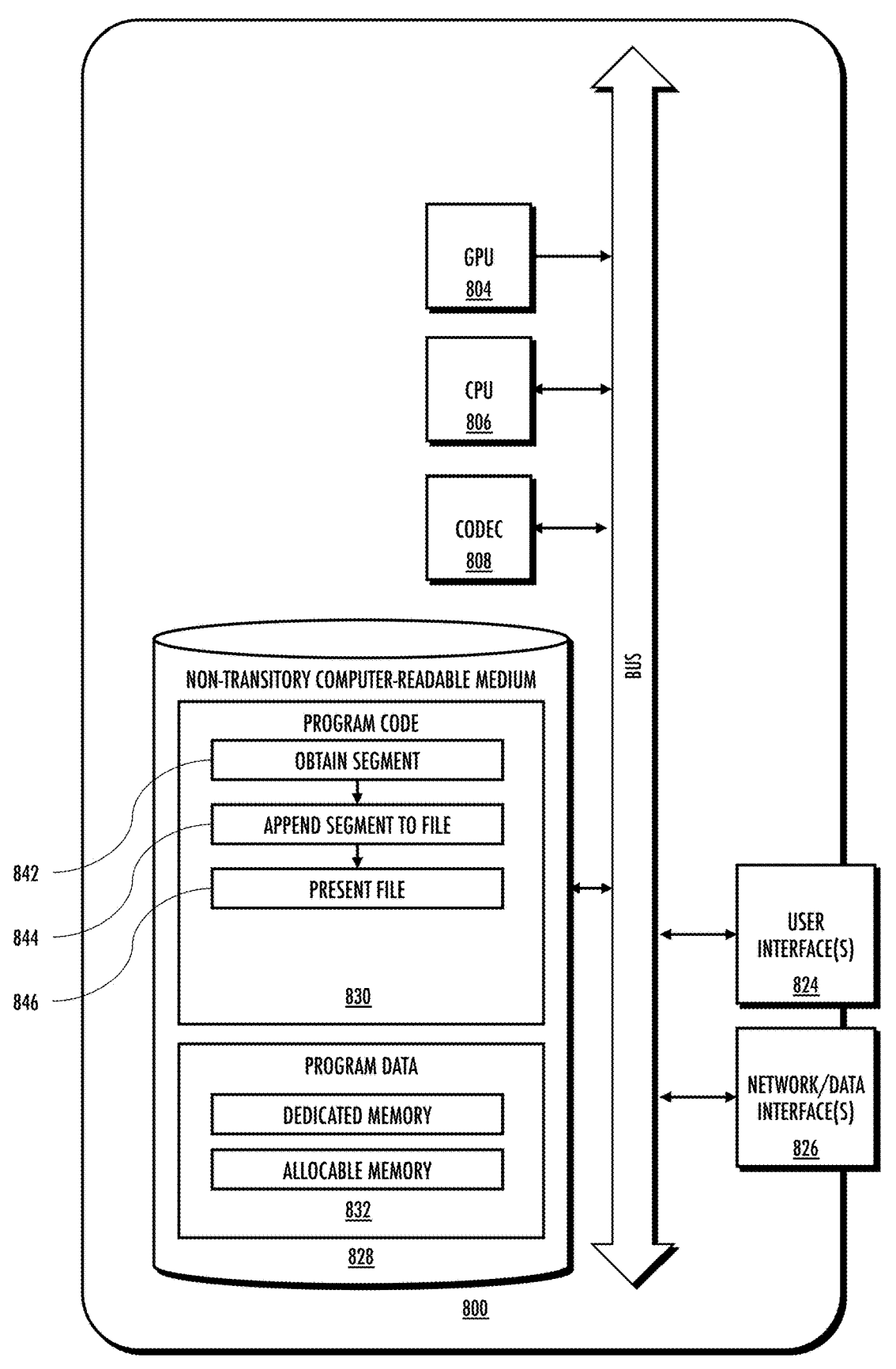
FIG. 8 is a logical block diagram of an exemplary decoding device.

FIG. 8 is a logical block diagram of an exemplary decoding device 800. The decoding device 800 includes: a user interface subsystem, a communication subsystem, a control and data subsystem, and a bus to enable data transfer. The following discussion provides a specific discussion of the internal operations, design considerations, and/or alternatives, for each subsystem of the exemplary decoding device 800.

User Interface Subsystem

Functionally, the user interface subsystem 824 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 824 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

While the foregoing discussions have been presented within the context of a smart phone, a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touchscreen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touchscreens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) In contrast, the data interfaces are configured to read/write data to a removeable non-transitory computer-readable medium (e.g., flash drive or similar memory media).

The illustrated network/data interface 826 may include network interfaces including, but not limited to: Wi-Fi, Bluetooth, Global Positioning System (GPS), USB, and/or Ethernet network interfaces. Additionally, the network/data interface 826 may include data interfaces such as: SD cards (and their derivatives) and/or any other optical/electrical/magnetic media (e.g., MMC cards, CDs, DVDs, tape, etc.)

Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 8, the control and data subsystem may include one or more of: a central processing unit (CPU 806), a graphics processing unit (GPU 804), a codec 808, and a non-transitory computer-readable medium 828 that stores program instructions and/or data. In the illustrated embodiment, the memory subsystem may be bifurcated into program code 830 and/or program data 832. Notably, smart phones and similar devices may have memory architectures that have some tasks that operate in real-time (or near real-time), and other tasks that operate at best effort. Thus, in some variants, the program data may be further organized according to dedicated memory spaces which guarantee performance (e.g., latency, access times, etc.) and/or freely allocable memory which is more flexible.

Segmented Updates to a Video File

In one embodiment, the non-transitory computer-readable medium includes a routine that updates a video file in segments. This may be used to implement e.g., touchless monitoring of an ongoing video capture. When executed by the control and data subsystem, the routine causes the decoding device to: obtains a video segment, appends the video segment to a video file, and presents the video file.

In step 842, the decoding device obtains a video segment. In one embodiment the video segment is received via a wireless link from the encoding device. In some variants, the video segment is characterized by a playback rate (which is distinct from the capture rate). In some embodiments, the video segment corresponds to a GOP of a larger video. More generally, the decoding device may obtain any portion of a media file (e.g., audio, text, data, etc.).

In step 844, the decoding device appends the video segment to a video file. In one embodiment, the decoding device opens a video file of an ongoing capture and appends the video segment to the video file. In other embodiments, the video file may be pre-segmented (e.g., HTTP Live Streaming, or similar streaming formats).

In step 846, the decoding device presents the video file (including appended segment). In one embodiment, the decoding device (a smart phone) plays back a video, this may be used by a user to "check" an ongoing capture, without touching the capture device.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/ or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A camera apparatus, comprising:
a camera sensor;
a codec;
a power supply configured to selectively provide power to the camera sensor and the codec;
a processor; and
a non-transitory computer-readable medium comprising one or more instructions which, when executed by the processor, cause the camera apparatus to:
determine a capture time scale;
enable the power supply for the camera sensor for each capture of a first set of images and a second set of images based on the capture time scale;
disable the power supply for the camera sensor between each capture of the first set of images and the second set of images;
enable the power supply for the codec and encode the first set of images into a first segment of a video after the first set of images is captured; and
enable the power supply for the codec and encode the second set of images into a second segment of the video after the second set of images is captured, and where the power supply is disabled for the codec between encoding the first segment of the video and the second segment of the video.

2. The camera apparatus of claim 1, where the first segment of the video is encoded according to a replay time scale that is different than the capture time scale.

3. The camera apparatus of claim 1, where the first segment of the video is transmitted to an other device for review.

4. The camera apparatus of claim 1, where the camera apparatus further includes a user interface configured to obtain user input and where the capture time scale is determined from the user input.

5. The camera apparatus of claim 1, where the camera apparatus further includes a network interface configured to communicate with an other device and where the capture time scale is determined from the other device.

6. The camera apparatus of claim 1, where the camera apparatus further includes a network interface configured to communicate with an other device and where the capture time scale is determined from the other device.

7. A camera apparatus, comprising:

a first logic configured to enable power to a camera sensor during capture states;

a second logic configured to disable power to the camera sensor during sleep states that occur between the capture states;

a third logic configured to encode light information captured during the capture states into a first set of images and a second set of images; and a fourth logic configured to encode the first set of images into a video segment first segment of a video, and the second set of images into a second segment of the video, and where the fourth logic is further configured to sleep between encoding the first set of images and the second set of images.

8. The camera apparatus of claim 7, where the video comprises a timelapse capture.

9. The camera apparatus of claim 7, where the light information is JPEG-encoded into the first set of images and the second set of images.

10. The camera apparatus of claim 9, where the first set of images and the second set of images are MPEG-encoded into the first segment and the second segment of the video.

11. The camera apparatus of claim 10, where the capture states are triggered according to a capture time scale, and where the first segment and the second segment are characterized by a playback time scale that is different than the capture time scale.

12. The camera apparatus of claim 10, further comprising a fifth logic configured to transmit the first segment and the second segment to an other device.

13. A method, comprising:

enabling power to a camera sensor during capture states;

disabling power to the camera sensor during sleep states that occur between the capture states;

encoding light information captured during the capture states into a first set of images and a second set of images; and encoding the first set of images into a first segment of a video, and the second set of images into a second segment of the video and sleeping between encoding the first set of images and the second set of images.

14. The method of claim 13, further comprising opening a first file structure to store the first set of images and where the first file structure remains open during at least a first sleep state that occurs between the capture states.

15. The method of claim 14, further comprising closing the first file structure before encoding the first set of images into the first segment.

16. The method of claim 15, further comprising opening a second file structure to store the second set of images and where the second file structure remains open during at least a second sleep state that occurs between the capture states.

17. The method of claim 16, further comprising closing the second file structure before encoding the second set of images into the second segment.

18. The method of claim 17, further comprising appending the second segment to the first segment.

* * * * *